Dec. 21, 1926.  
J. H. BOURGON  
1,611,302  
STEERING POST SUPPORT  
Filed May 8, 1924
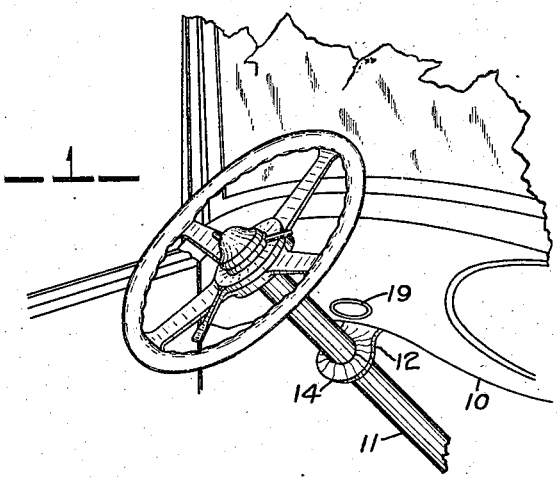
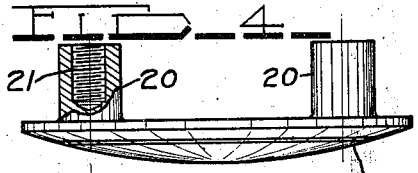
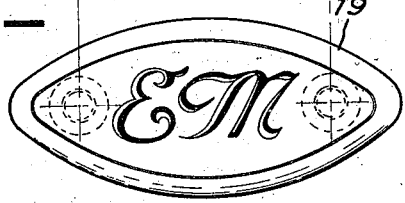
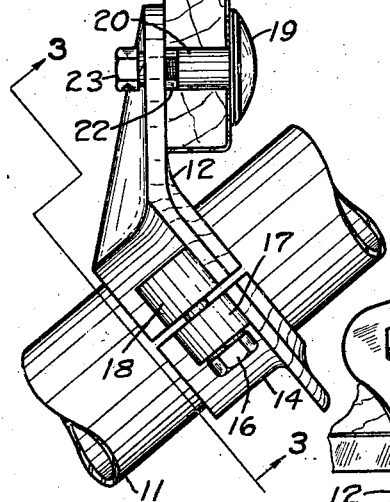
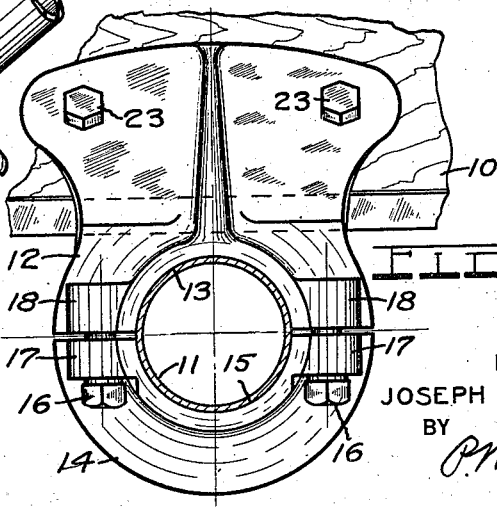
INVENTOR  
JOSEPH H. BOURGON  
BY  
ATTORNEY Patented Dec. 21, 1926.

1,611,302

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

STEERING-POST SUPPORT.

Application filed May 8, 1924. Serial No. 711,760.

This invention relates to brackets for supporting and preventing vibration of steering posts of automobiles and is of the type which is fastened to the instrument boards of such automobiles.

An object of the present invention is to provide such a bracket that is simple in construction, efficient in operation, is pleasing to the eye, and adds materially to the finish and distinctiveness of the automobile.

Another object is to provide such a bracket which is adapted to be secured to the back face of an instrument board and is held in such place by means of a plate on the exposed face of the board which is provided with threaded bosses projecting into the instrument board and which co-operate with screw means passing through the bracket for the purpose of holding the same in position.

A still further object is to provide such a plate co-operating with the bracket for holding the latter to the instrument board, which plate is adapted to form an ornamental monogram plate.

The above being among the objects of the present invention, the same consists of certain features of construction and combination of parts to be hereinafter described with reference to the accompanying drawings, and then claimed, having the above and other objects in view.

In the drawings, which illustrate a suitable embodiment of the present invention, and in which like numerals refer to like parts throughout the several views, Figure 1 is a fragmentary perspective view of the instrument board, steering post and adjacent parts of an automobile in which the steering post is supported by the instrument board by means of the bracket disclosed in the present invention.

Figure 2 is a fragmentary partially sectioned side view of the instrument board, steering post and steering post bracket shown in perspective in Figure 1.

Figure 3 is a view taken on the line 3—3 of Figure 2.

Figure 4 is a partially broken top plan view of the monogram plate shown in side elevation in Figure 2.

Figure 5 is a face view of the monogram plate.

As in the conventional automobiles, an instrument board 10 is provided adjacent the upper forward edge of the driving compartment and extends transversely across the same and is suitably secured in place in the automobile body. Extending angularly upwardly from below the instrument board 10 is the steering post 11 which passes close to the instrument board 10. In the present instance a bracket 12 is secured to the rear or unexposed face of the instrument board 10 and is provided at its lower end with a semi-circular seat 13 which is adapted to receive the steering post 11. A cap 14, also having a semi-circular seat 15, fits around the under side of the steering post 11 and is secured to the bracket 12 by means of the screws 16 passing through the ears 17 and threading into the ears 18 on the bracket 12, the cap 14 clamping the steering post 11 to the bracket 12 when the screws 16 are drawn up in place. The faces of the bracket 12 and cap 14 are broadened or flanged out so that the ears 17 and 18 and the screws 16 are concealed from view from the driving compartment side thereof.

The bracket 12 is secured to the instrument board 10 in the following manner. A plate 19, of a suitable size and shape and which preferably is of such design as to be used as a monogram plate, is provided with two rearwardly extending bosses 20 each of which is provided with an axial blind threaded opening 21 opening from the free or rear end thereof. Openings 22 are provided in the instrument board 10 for the reception of the bosses 20, the flat, rear face of the plate 19 laying flat against the instrument board 10. Screws such as 23 are introduced from the back through openings in the bracket 12 and are threaded into the openings 21 in the bosses 20, drawing both the bracket 12 and plate 19 into close relationship with the instrument board 10 and securely supporting the steering post 11 to the instrument board 10 thereby.

It will be seen that this construction provides a simple and effective method of securing the steering post bracket to the instrument board and one which may be made extremely pleasing to the eye. The plate 19 is preferably formed of such material and in such a manner that the owner of the automobile of which it forms a part may remove it and have his monogram or other symbol engraved or otherwise put thereon as illustrated in Figure 5 which not only adds to the appearance and finish but also materially adds to the distinctiveness thereof. It will also be observed that I have provided a support for a steering column which does not show any exposed fastening means from the driver's compartment as all bolts, rivets or other securing means are entirely hidden from view, although the parts are readily accessible if it is desired to disconnect the steering post from the automobile body.

Formal changes may be made in the specific embodiment of the invention described without departing from the spirit or substance of the broad invention, the scope of which is commensurate with the appended claims.

What I claim is:—

1. In combination with the instrument board of an automobile, of a steering post bracket having a flanged extension positioned against the unexposed face of said instrument board, an ornamental plate on the exposed face of said instrument board, said plate having projecting bosses provided with internally threaded, blind openings projecting into said instrument board, and screw means inserted from the unexposed face of said instrument board through said flanged extension on said bracket and said threaded bosses on said plate whereby to secure both said bracket and ornamental plate in position without exposing said screw means.

2. In combination with the instrument board of an automobile and a steering post to be supported thereby, means for securing said post to said board comprising a bracket having a flange surrounding a portion of said steering post, and a flange perpendicular thereto, said last named flange terminating in an upwardly extending portion adapted to be positioned on the unexposed side of said instrument board, a cap surrounding a portion of said post having a flange in matching relation to said second flange, means unexposed from the driver's compartment for securing said bracket and cap together around said steering post, an ornamental plate lying against the exposed face of said board provided with blind threaded bosses projecting into said board, and screws insertable from the unexposed face side of said board through said bracket into said blind threaded bosses on said plate to secure said bracket and plate on said board.

Signed by me at Detroit, Michigan, U. S. A., this 3rd day of May, 1924.

JOSEPH H. BOURGON.